(12) United States Patent
Narayanam et al.

(10) Patent No.: US 10,475,062 B2
(45) Date of Patent: Nov. 12, 2019

(54) REWARDING ONLINE USERS AS A FUNCTION OF NETWORK TOPOLOGY

(71) Applicant: International Business Machines Corporation, Armonk, NY (US)

(72) Inventors: Krishnasuri Narayanam, Bangalore (IN); Ramasuri Narayanam, Bangalore (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 15/397,254

(22) Filed: Jan. 3, 2017

(65) Prior Publication Data

US 2018/0189818 A1   Jul. 5, 2018

(51) Int. Cl.
    *G06Q 30/02*   (2012.01)
    *G06Q 50/00*   (2012.01)

(52) U.S. Cl.
    CPC ..... *G06Q 30/0239* (2013.01); *G06Q 30/0214* (2013.01); *G06Q 30/0224* (2013.01); *G06Q 50/01* (2013.01)

(58) Field of Classification Search
    None
    See application file for complete search history.

(56) References Cited

U.S. PATENT DOCUMENTS

| 8,606,787 | B1 * | 12/2013 | Asgekar | G06F 16/285 |
| | | | | 707/737 |
| 8,706,647 | B2 * | 4/2014 | Pathak | G06Q 30/0201 |
| | | | | 705/319 |
| 9,760,619 | B1 * | 9/2017 | Lattanzi | G06F 16/285 |
| 9,787,705 | B1 * | 10/2017 | Love | H04L 63/1425 |

(Continued)

FOREIGN PATENT DOCUMENTS

WO    WO2011/148222 A1 * 12/2011 .............. H04L 29/08

OTHER PUBLICATIONS

A recommender system based on local topology features and message rate; Rokni et al., Second International Congress on Technology, Communication and Knowledge (ICTCK 2015) Nov. 11-12, 2015—Mashhad Branch, Islamic Azad University, Mashhad, Iran.*

(Continued)

*Primary Examiner* — David J Stoltenberg
(74) *Attorney, Agent, or Firm* — Schmeiser, Olsen & Watts; Mark C. Vallone (57) ABSTRACT

A method and associated systems for rewarding online users as a function of network topology. An online-reward system receives a network topology and an unweighted base reward schedule that specifies amounts of incentive rewards to be awarded to performing users who perform a solicited desired action and to intermediary users who forward such a solicitation to another user. The system computes a position value for each node as a function of the node's position in the topology and uses those values to weight the base rewards.

(Continued)

Each time the network topology changes, this process is repeated to immediately update weightings of nodes affected by the change. When a network user performs a solicited activity, the processor physically transfers rewards to the accounts of the performing and intermediary users, using the weighted values to determine the amount of each reward.

17 Claims, 5 Drawing Sheets

(56) References Cited

U.S. PATENT DOCUMENTS

| | | | | |
|---|---|---|---|---|
| 2005/0243736 | A1* | 11/2005 | Faloutsos | G06Q 10/04 370/254 |
| 2006/0143081 | A1* | 6/2006 | Argaiz | G06Q 30/02 705/14.53 |
| 2008/0043634 | A1* | 2/2008 | Wang | H04L 67/104 370/252 |
| 2008/0256233 | A1* | 10/2008 | Hall | G06Q 30/02 709/224 |
| 2010/0145771 | A1* | 6/2010 | Fligler | G06Q 10/10 705/319 |
| 2010/0284309 | A1* | 11/2010 | Allan | H04L 45/00 370/256 |
| 2010/0312649 | A1* | 12/2010 | Lurie | G06Q 30/02 705/14.66 |
| 2012/0021815 | A1* | 1/2012 | Douceur | G07F 17/32 463/17 |
| 2012/0072475 | A1* | 3/2012 | Morrison | G06F 17/10 708/200 |
| 2012/0158477 | A1* | 6/2012 | Tennenholtz | G06Q 30/0217 705/14.19 |
| 2012/0290649 | A1* | 11/2012 | Ramirez | H04L 67/22 709/204 |
| 2013/0006733 | A1 | 1/2013 | Fisher | |
| 2013/0046797 | A1* | 2/2013 | Muntz | G06Q 10/00 707/803 |
| 2013/0085838 | A1* | 4/2013 | Tennenholtz | G06Q 10/04 705/14.41 |
| 2013/0163471 | A1* | 6/2013 | Indukuri | G06Q 10/00 370/255 |
| 2013/0238446 | A1* | 9/2013 | Rohan | G06Q 30/02 705/14.66 |
| 2013/0290084 | A1* | 10/2013 | Ur | G06Q 30/02 705/14.16 |
| 2013/0339352 | A1* | 12/2013 | Jin | G06F 17/30958 707/736 |
| 2013/0346172 | A1 | 12/2013 | Wu | |
| 2014/0075002 | A1* | 3/2014 | Pradhan | G06Q 30/0255 709/223 |
| 2014/0100943 | A1* | 4/2014 | Palihapitiya | G06Q 30/0251 705/14.39 |
| 2014/0108156 | A1* | 4/2014 | Hillerbrand | G06Q 30/0255 705/14.66 |
| 2014/0114737 | A1* | 4/2014 | Espejo | G06Q 30/02 705/14.27 |
| 2014/0180786 | A1* | 6/2014 | Sullivan | G06Q 30/0226 705/14.27 |
| 2014/0181120 | A1* | 6/2014 | Sullivan | G06Q 50/01 707/748 |
| 2014/0181196 | A1* | 6/2014 | Sullivan | H04L 67/22 709/204 |
| 2014/0351271 | A1* | 11/2014 | Fairchild-Coppoletti | G06F 17/30038 707/749 |
| 2015/0006268 | A1* | 1/2015 | Cohen | G06Q 30/0214 705/14.16 |
| 2015/0106178 | A1* | 4/2015 | Atazky | H04L 51/32 705/14.16 |
| 2015/0120717 | A1* | 4/2015 | Kim | G06F 17/30699 707/727 |
| 2015/0178176 | A1* | 6/2015 | Gilbao | G06F 8/65 714/4.2 |
| 2015/0200905 | A1* | 7/2015 | Jandhyala | H04L 51/32 709/206 |
| 2015/0254371 | A1* | 9/2015 | Zhang | H04L 67/306 707/798 |
| 2015/0326466 | A1* | 11/2015 | Hegde | G06Q 10/10 709/223 |
| 2016/0314501 | A1* | 10/2016 | Bartholomew | G06Q 30/0275 |
| 2016/0380877 | A1* | 12/2016 | Allan | H04L 45/00 370/256 |
| 2017/0085607 | A1* | 3/2017 | Li | H04L 65/403 |
| 2017/0329844 | A1* | 11/2017 | Tacchi | G06F 17/30696 |
| 2017/0330357 | A1* | 11/2017 | Siegel | G06T 11/206 |
| 2018/0018709 | A1* | 1/2018 | Sela | G06Q 30/0271 |
| 2018/0032568 | A1* | 2/2018 | Pal | G06Q 50/01 |

OTHER PUBLICATIONS

Probabilistic Diffusion of Social Influence with Incentives; Doo et al., IEEE Transactions on Services Computing, vol. 7, No. 3, Jul.-Sep. 2014.*

A Scalable Algorithm for Discovering Topologies in Social Networks; Yadav et al., 2014 IEEE International Conference on Data Mining Workshop.*

* cited by examiner

REWARDING ONLINE USERS AS A FUNCTION OF NETWORK TOPOLOGY

BACKGROUND

The present invention relates to rewarding users of an online network who perform a desired activity. In particular, it relates to awarding an incentive to an eligible user as a function of that user's position within the network's topology.

Businesses that wish to encourage users of social networks and other types of networks and online communities to perform a certain activity may provide an incentive to a user that performs the desired activity. That incentive may be in the form of an electronic or printed coupon or a discount code that the user may apply to an online or bricks-and-mortar purchase; a cash-value award transferred to a user's personal account or to a user account associated with the network or online community; or any other type of incentive, such as access to a secured online asset or to otherwise-restricted or secured feature of a software program.

Such incentives may be used to encourage any type of desired online behavior, such as forwarding a link or other online content, clicking through an online link or advertisement, completing a survey, opening an account, playing or downloading a data file or audio/visual content, upgrading or updating a software application, or submitting feedback, comments, reviews, or other information.

More sophisticated incentive systems also provide rewards for users who in some way facilitate another user's performance of a desired activity. For example, if an online ad includes a "Share" button that allows a first user to forward the ad to a second user who, in response, makes a desired purchase, a "multi-level" incentive system might provide a full incentive to the purchasing user and a partial incentive to the intermediary forwarding user.

Multi-level systems may determine the value of a reward by referring to a reward schedule. Such schedules may be based on a formula for computing full and partial incentives or may be as simple as setting an award value to an arbitrary flat amount or to a fixed percent of the deemed value of a desired activity. But even a relatively simple schedule capable of determining partial awards for intermediary users can become complex on larger networks, where many intermediary network nodes may lie along a network path from a "seed node" of the network, which originates a solicitation to perform a desired activity, to a "performer node" of a user who actually performs the desired activity.

One problem with such network-reward mechanisms is that not all users have identical value to a solicitor. Some users, for example, may have a far greater number of connections to other users or may be the network's only connection to a large subnetwork of desired users.

Practical, real-world implementations of multi-level reward mechanisms generally cannot account for such differences in the relative values of intermediary nodes. There is therefore a need for a method to determine relative values of nodes in order to provide more accurate incentives to users who occupy an intermediary position between a seed node and a performer node.

BRIEF SUMMARY

An embodiment of the present invention provides An online reward system comprising a processor, a memory coupled to the processor, a network interface capable of allowing the processor to transfer an online reward to an account of a user of a network, and a computer-readable hardware storage device coupled to the processor, the hardware storage device containing program code configured to be run by the processor via the memory to implement a method for rewarding online users as a function of network topology, the method comprising:

the processor receiving a representation of a topology of the network and a set of base reward values, where each value of the set of base reward values identifies a value of a reward to be awarded to a user who, at a particular node of the network, either performs a solicited action or forwards to another node of the network a previously received solicitation to perform the solicited action;

the processor identifying a set of seed nodes of the network that are each capable of soliciting the solicited action;

the processor computing a position value for each non-seed node of the network as a function of the topology;

the processor adjusting the set of base reward values as a function of the computed position values;

the processor detecting that a user at a performing node of the network has performed an activity solicited by a soliciting node of the set of seed nodes;

the processor associating with an eligible node a value of a final reward, as a function of an adjusted value of the adjusted set of base reward values that is associated with the eligible node, where the eligible node lies on a network path connecting the soliciting node to the performing node; and the processor delivering the final reward to an account associated with a user of the eligible node.

Another embodiment of the present invention provides a method for rewarding online users as a function of network topology, the method comprising:

a processor of a computer system receiving a representation of a topology of the network and a set of base reward values, where each value of the set of base reward values identifies a value of a reward to be awarded to a user who, at a particular node of the network, either performs a solicited action or forwards to another node of the network a previously received solicitation to perform the solicited action;

the processor identifying a set of seed nodes of the network that are each capable of soliciting the solicited action;

the processor computing a position value for each non-seed node of the network as a function of the topology;

the processor adjusting the set of base reward values as a function of the computed position values;

the processor detecting that a user at a performing node of the network has performed an activity solicited by a soliciting node of the set of seed nodes;

the processor associating with an eligible node a value of a final reward, as a function of an adjusted value of the adjusted set of base reward values that is associated with the eligible node, where the eligible node lies on a network path connecting the soliciting node to the performing node; and the processor delivering the final reward to an account associated with a user of the eligible node.

Yet another embodiment of the present invention provides a computer program product, comprising a computer-readable hardware storage device having a computer-readable program code stored therein, the program code configured to be executed by an online reward system comprising a processor, a memory coupled to the processor, a network interface capable of allowing the processor to transfer an online reward to an account of a user of a network, and a computer-readable hardware storage device coupled to the processor, the hardware storage device containing program code configured to be run by the processor via the memory to implement a method for rewarding online users as a function of network topology, the method comprising:

the processor receiving a representation of a topology of the network and a set of base reward values, where each value of the set of base reward values identifies a value of a reward to be awarded to a user who, at a particular node of the network, either performs a solicited action or forwards to another node of the network a previously received solicitation to perform the solicited action;

the processor identifying a set of seed nodes of the network that are each capable of soliciting the solicited action;

the processor computing a position value for each non-seed node of the network as a function of the topology;

the processor adjusting the set of base reward values as a function of the computed position values;

the processor detecting that a user at a performing node of the network has performed an activity solicited by a soliciting node of the set of seed nodes;

the processor associating with an eligible node a value of a final reward, as a function of an adjusted value of the adjusted set of base reward values that is associated with the eligible node, where the eligible node lies on a network path connecting the soliciting node to the performing node; and the processor delivering the final reward to an account associated with a user of the eligible node.

DETAILED DESCRIPTION

Embodiments of the present invention provide a method and associated systems for rewarding online users who perform a desired activity, such as clicking on a link, purchasing a product or service, providing feedback to an online posting, creating an account, submitting personal information, viewing verbal or audio/visual content, or forwarding a link, a viral-marketing or crowdsourcing message, an advertisement, or other electronic information to another user.

More sophisticated "multi-level" incentive systems also deliver rewards to users who facilitate another user's performance of a desired activity. For example, if an online ad includes a "Share" button that allows a first user to forward the ad to a second user, who then responds by making a desired purchase, a multi-level incentive system might provide a full incentive to the purchaser and a partial incentive to the forwarding (or "intermediary") user.

Multi-level systems typically compute an amount of an intermediary's reward by referring to a predefined reward schedule. These schedules may be based on an arbitrary formula for computing such partial incentives or may even award the same incentive to every qualifying intermediary.

Identifying eligible intermediaries can quickly become complex on larger networks, where many intermediary network nodes may lie along a network path from a "seed node" of the network (which solicits the performance of a desired activity) to a "performer node" of a user who actually performs the desired activity.

In such real-world environments, it can be difficult to efficiently determine an amount of an intermediary's partial reward unless that reward is determined by the simplest of computations. Unlike pre-Internet manually implemented multi-level incentive systems, such as a traditional multi-level marketing system, online multi-level transactions must account for network-related constraints that make some intermediaries more valuable than others.

For example, an accurate multi-level online incentive mechanism should reward intermediary online users in a manner that is proportional to each user's relative importance, based on each user's current position within a continuously changing network topology. Existing incentive methods that merely copy pre-Internet, non-computerized incentive methods by setting standard commission values for intermediaries, cannot account for differences in influence related to an intermediary's network connectivity. There is thus a need for some way to account for these network topology-related factors when incentivizing desired behavior among users of an electronic network.

Embodiments of the present invention solve this technical problem, which is rooted in online e-commerce technology and which does not occur in traditional non-computerized incentive systems, by automatically calculating and delivering topology-aware rewards to intermediary online users who facilitate another user's performance of a desired activity.

For example, greater importance may be given to a user who occupies the only path between a seed node and a performing user's node, or who occupies a gatekeeper location between two large subnets. Without that user's cooperation, a large number of other users may be rendered unreachable to the seed node. On the other hand, if many other paths exist between a seed node and a performing node, or between two subnets that may comprise many potential performing users, the value of the intermediary's contribution is less critical. Even if the intermediary does not choose to forward a seed node's solicitation, that choice does not necessarily isolate the seed from a large number of users.

The present invention determines a relative importance (or "position value") for each intermediary user based on such topological considerations, and then uses these position values to weight a partial award value. This weighting allows the final amount of the partial award to better reflect an intermediary user's true contribution and importance. This determination is performed by analyzing the network's topology to determine which users occupy network nodes that are topologically positioned to assert the greatest influence on other users' behavior. Embodiments then deliver the weighted incentives to each recipient.

Certain embodiments may also solve a second technical problem rooted in multi-level incentive technologies that operate on online networks. Because such networks are continuously changing as users enter and leave the network, a topology-aware method of determining partial incentives must be fast enough and efficient enough to be able to constantly update its previously derived incentive values every time the network topology changes. A system that cannot respond quickly enough will be prone to errors caused by its inability to identify a correct, current topology at the exact time that a performing user responds to a solicitation. This advantage thus provides a technical advantage over existing static multi-level award systems that cannot account for the effect of a continuously evolving network topology on the relative importance of each user.

Embodiments and examples described in this document refer, for pedagogical purposes, to online social networks where each user is known to have an account to which funds, coupon codes, or other incentives may be transferred. This should not be construed to limit the present invention to such environments. Methods analogous to those described here may be used in any sort of electronic network, or other type of communications environment, where one party desires to induce a certain behavior in other parties. Such environments may include, but are not limited to, cellular networks, user groups, intranets, or private cloud-computing environments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
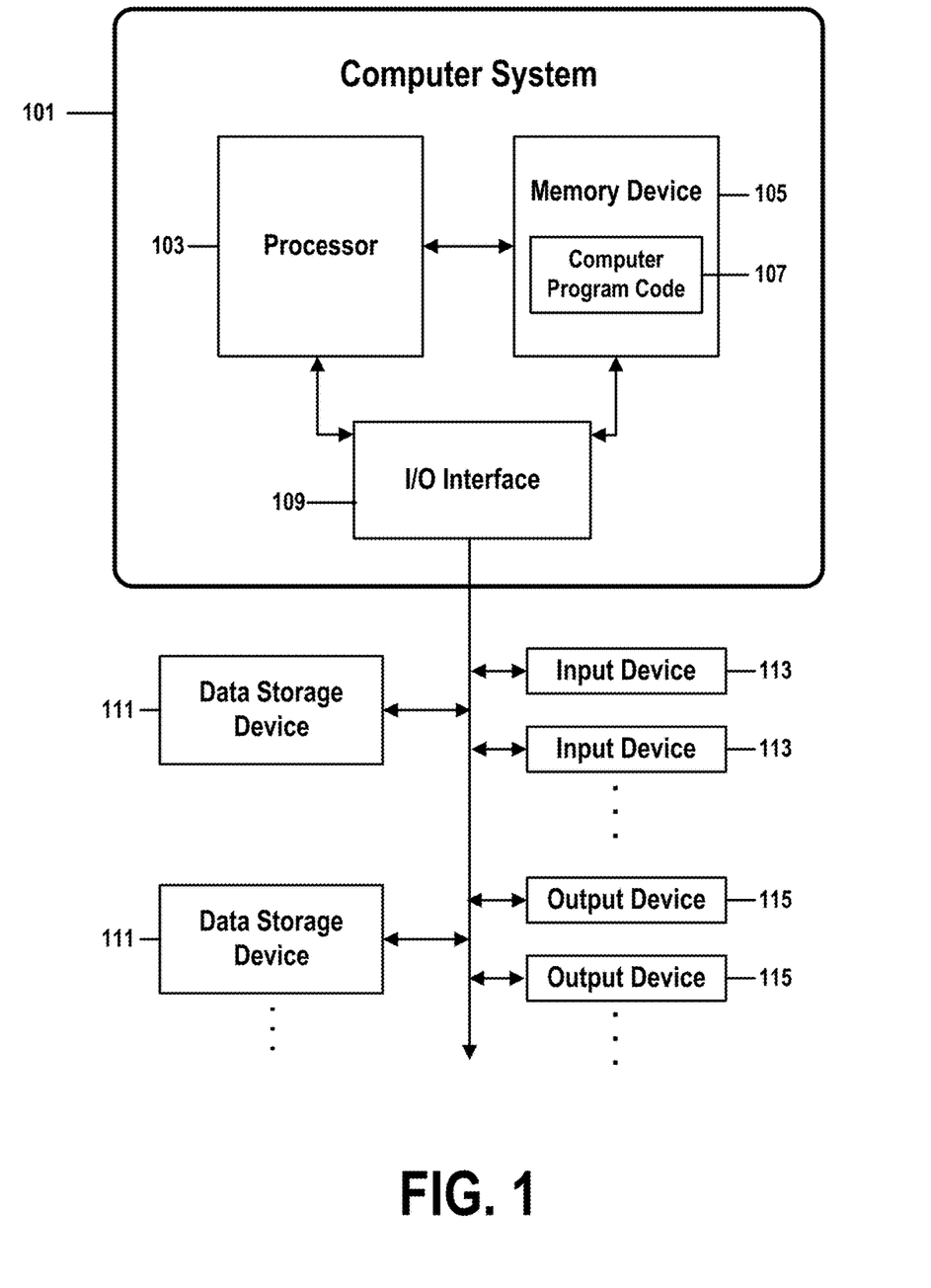
FIG. 1 shows the structure of a computer system and computer program code that may be used to implement a method for rewarding online users as a function of network topology in accordance with embodiments of the present invention.

FIG. 1 shows a structure of a computer system and computer program code that may be used to implement a method for rewarding online users as a function of network topology in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for rewarding online users as a function of network topology in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for rewarding online users as a function of network topology.

Any of the components of the present invention could be created, integrated, hosted, maintained, deployed, managed, serviced, supported, etc. by a service provider who offers to facilitate a method for rewarding online users as a function of network topology. Thus the present invention discloses a process for deploying or integrating computing infrastructure, comprising integrating computer-readable code into the computer system 101, wherein the code in combination with the computer system 101 is capable of performing a method for rewarding online users as a function of network topology.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for rewarding online users as a function of network topology may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for rewarding online users as a function of network topology is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2A:
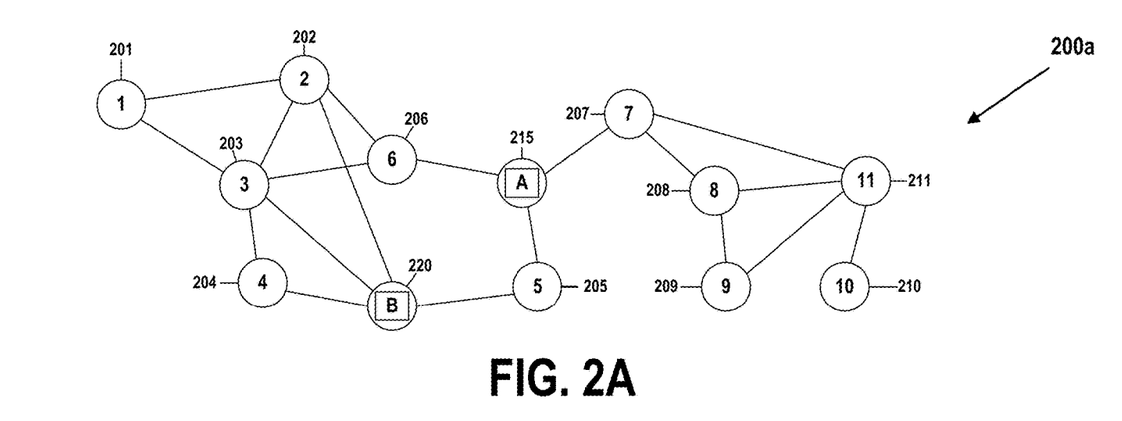
FIG. 2A represents as an undirected graph a topology of a network in which one or more "seed" nodes solicit users to perform a desired activity.

FIG. 2A represents as an undirected graph 200a a topology of a network in which one or more "seed" nodes solicit users to perform a desired activity. FIG. 2A comprises items 200a-210.

Graph 200a comprises: vertices 201-210 and the edges that connect each pair of vertices 201-210. Each vertex 201-210 represents one network node and the vertices are labeled in the figure as nodes "1" through "10." An edge that connects two vertices of the graph represents a network path between the pair of network nodes represented by the two vertices.

Items 215 and 220 are two additional vertices that each represents a "seed" node of the network. Here, vertex 215 represents seed node "A" and vertex 220 represents seed node "B." Because graph 200a represents underlying relationships and connections among networked individuals, this document will refer to graph 200a as a "social graph."

Figure 2B:
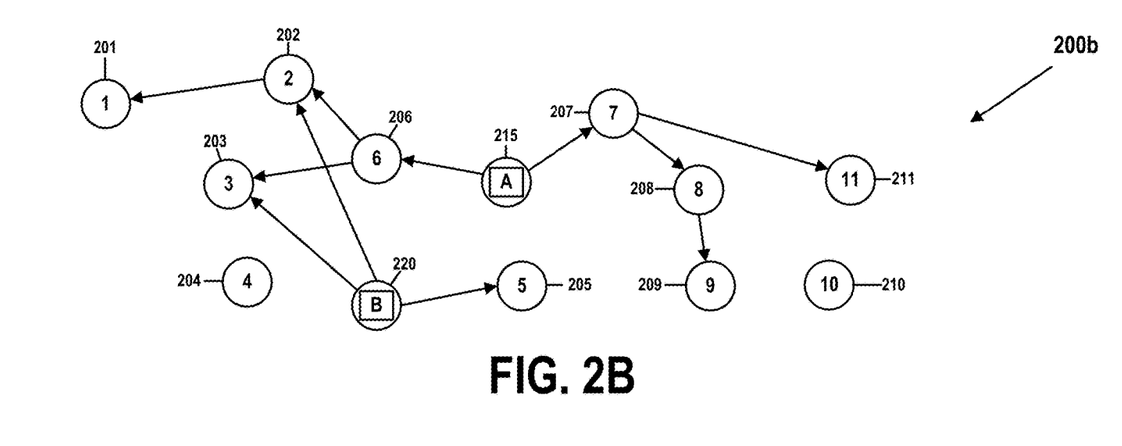
FIG. 2B represents, as a directed graph, examples of trace paths through the social network represented by the graph of FIG. 2A.

In the exemplary network represented by graph 200a, a soliciting party, such as an e-commerce vendor, advertiser, community organizer, media outlet, or crowdsourcing party, solicits a desired behavior by means of a solicitation originating from one or more of the seed nodes represented by vertices 215 and 220. This solicitation may traverse a network path to other nodes of the network represented by vertices 201-210. As shown in FIG. 2B, such a network path may be represented as a contiguous sequence of edges that connecting a soliciting seed vertex 215 or 220 to a vertex 201-210 that represents a user node to which the solicitation is forwarded.

For example, if node "A" 215 displays a clickable link to an online video ad, that link may be forwarded through the network to a user at the network node represented by vertex "6" 206, who may next forward the link to a user at the node represented by vertex "2" 202.

If the link is not forwarded by the user represented by vertex "2" 202, then the path from vertex A 215 through vertex "6" 206 through vertex "2" 202 is referred to as a "trace path" of an actual performance of a solicited activity, running from soliciting node "A" to terminating node "2." If node "2" is the final node of the path because the user at node "2" performs the solicited activity—here, clicking the link to view the online video ad—then node "2" is known as the "performing" node and vertex 202 is known as the corresponding "performing" vertex of social graph 200a.

Many node pairs of graph 200a, such as nodes 205 and 209, are not directly connected by a single edge, indicating that there is no direct social relationship between the two nodes. In embodiments of the present invention that support a social-network or other type of team-oriented or collaborative platform or environment, some network nodes may not, at times, be associated with a currently active user. Similarly, some pairs of users may not, at times, be directly connected, as when a network connection between two users is defined as requiring a mutual "friend" status between the two users.

FIG. 2A illustrates how certain vertices or nodes may have greater importance than others. For example, if node 7 (represented by vertex 207) does not forward any received solicitations, then nodes 8, 9, 10, and 11 become unavailable to seed nodes A and B (represented by seed vertices 215 and 220). But if node 6 (represented by vertex 206) does not forward a solicitation, alternate (albeit possibly longer) paths still remain available to transport solicitations from either seed node to all other nodes of the network.

It would thus be more important to a solicitor that a user of a node 7 forward a solicitation than would be for a user at node 6 to do so Furthermore, the relative importance of each node of the network may vary continuously as users enter or leave the network or connect to or disconnect from other network users. So, given the topology of FIG. 2A, greater incentives might be awarded to a user at node 7 than those that would be awarded to a user at node 6, but that relationship could be continuously changing as the topology of the social network 200a itself changes in real time. The present invention offers a novel solution to this problem, which is necessarily rooted in social-networking technology, by exploiting inherent characteristics of the network topology itself.

FIG. 2B represents, as a directed graph 200b, examples of trace paths through the social network represented by graph 200a of FIG. 2A. In FIG. 2B, each trace path represents a path through the underlying network between a soliciting seed node and a responding node that performs a solicited activity. This document refers to such a graph 200b as a "trace graph." FIG. 2B comprises items 200b-210 and vertices 201-220 are identical in function and form to identically numbered items of FIG. 2A.

The edges of graph 200b each show the direction and path of one segment of a trace path through which a solicitation may be forwarded through a seed node represented by vertex 215 or 220. In one example, the network seed node represented by seed vertex B 220 may transmit a product-purchase solicitation to nodes represented by vertices 203 and 204. If only network node 3, represented by vertex 203, responds with a purchase, a trace path is formed from seed vertex B 220 to vertex 203. No trace path exists in this example between seed vertex B 220 and vertex 204 because node 4, represented by vertex 204, did not respond to the solicitation by performing the desired action.

Similarly, a trace path exists from seed vertex A 215 to vertex 209, which also passes through intermediary vertices 207 and 208. This path represents a path through the network of a solicitation originating from seed node A and received by an intermediary node 7, which then forwards the received solicitation to a second intermediary node 8, which in turn finally forwards the solicitation to a performing node 9. The trace path ends with the vertex 209 that represents performing node 9.

Vertices 204 and 210 are not connected by a directed edge to any other vertices because, in the example of FIG. 2B, nodes 4 and 10, represented by those two vertices, do not accept or forward a solicitation from either seed node.

Figure 3A:
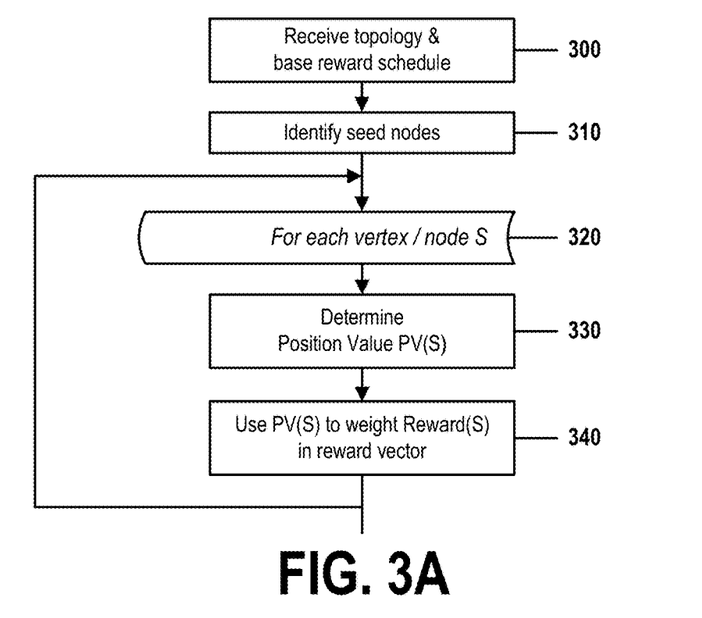
FIG. 3A is a flow chart that illustrates steps for determining partial incentive awards for online users in accordance with embodiments of the present invention.

FIG. 3A is a flow chart that illustrates steps for determining partial incentive awards for online users in accordance with embodiments of the present invention. FIG. 3A comprises steps 300-340.

In step 310, a processor of an online reward system receives a social graph that, like the social graph 200a of FIG. 2A, represents a topology of a network supported by the online reward system. As in the example of FIG. 2A, each vertex of the undirected social graph represents a node of the network and each edge between a pair of vertices represents a network path between nodes of the network represented by the two vertices.

The network may be any sort of network known in the art within which one or more seed nodes may attempt to solicit performance of a desired behavior from users at other nodes. In some embodiments, the network may be a social network, and certain of these embodiments may comprise, in addition to a processor, network interfaces, memory, and storage devices, other elements of the network, such as a cloud-computing environment on which the network's cloud-based infrastructure has been provisioned. Certain embodiments may further comprise software and stored data that allow the reward system to track locations, status, connectivity, user accounts, transactional histories, online resource accounts (such as a Bitcoin account or an e-payment account), or other components of a social network.

The processor also, in step 310, receives a base reward schedule that may be used to determine values of default rewards to be delivered to a user who performs a desired solicited action. Such base reward schedules, as are known in the art, may determine a value of an incentive to a performing user by any means desired by a system implementer. An incentive may, for example, be computed as a percent of a monetary value of a purchase made by a performing user or may be set to a predefined fixed value that is determined by business priorities or internal policies.

In a multi-level implementation, such as those comprised by the present invention, the base reward schedule may also identify values of incentive rewards awarded to intermediary users who forward a solicitation to perform a desired action to other users, but who do not themselves perform the desired action. Again, these values may be determined by any means known in the art, and may be determined by methods as simple as awarding each intermediary user a fixed percent of the incentive given to the performing user.

In one example a base reward schedule may pay a fixed reward of five cents to each performing user that responds to a solicitation to click a banner ad, and pays a fixed reward of one-tenth of one cent to each intermediary user who forwards a received link to the banner ad to another user without clicking the ad.

Many methods of determining values of a base reward schedule are known in the art, but schedules comprised by embodiments of the present invention all share one characteristic. They do not determine values of rewards awarded to intermediary users as a function of the users' relative positions within the received network topology.

In some embodiments, an incentive may be a monetary reward that the processor automatically transfers to an account of a performing user. In other cases, an incentive may be a discount or coupon code communicated to a performing user, or may even be a printed coupon that is mailed to the user.

Embodiments of the present invention are transparent to incentive values identified by the received base reward schedule (including a schedule of intermediary rewards), to a method by which those values are determined, to the precise nature of a reward, and to the exact method by which a reward is delivered or communicated to a performing user. There are many ways to implement all of these features, and embodiments are flexible enough to accommodate any method desired by an implementer that is known in the art.

In step 310, the processor identifies those nodes of the network that are soliciting "seed" nodes. This step may be performed as a function of the social graph and reward schedule received in step 300. In one example, the processor may assume that any node represented by a vertex of the received social graph that does not appear in the base reward schedule is a seed node because seed nodes solicit performance of a desired activity, rather than performing the activity themselves. In other cases, the processor may receive an express enumeration of seed nodes, or may receive other information from which the processor is capable of inferring or otherwise identifying seed nodes.

Step 320 begins an iterative procedure of steps 320 to 340, which is performed once for every vertex S of the social graph received in step 300 that is not a seed vertex, or is performed once for every non-seed node S of the social network represented by a non-seed vertex S.

In step 330, the processor determines a position value of non-seed vertex S, PV(S). PV(S) represents a relative importance of non-seed node S (represented by vertex S) as a function of the position of node S in the network. A method of determining a position value for a node S is described in FIG. 4.

In step 340, the processor weights the reward associated with node S (or, equivalently, with vertex S) as a function of the value of PV(S). This weighting may be done by any means known in the art and embodiments of the present invention may accommodate any such means desired by an implementer.

In a simple example, the processor may receive or construct a list of rewards associated with each non-seed node of the social network (or, equivalently, with each non-seed vertex of the received social graph) in the form of a vector, table, or other type of enumeration. For example, if the social network contains 5,000 non-seed nodes and the received social graph contains 4,000 corresponding non-seed vertices, the received base reward schedule may include a reward vector R in the form of a vector:

$$R=(R(1), R(2), \ldots R(S), \ldots R(5000))$$

In its simplest form, every element of vector R could be set to a constant value, rendering the base reward schedule position-independent. That is, the amount of a performance reward specified by the base reward schedule is the same for any node that performs a solicited action and the amount of a reward for an intermediary node that forwards a solicitation is likewise always the same, regardless of the position of the intermediary node in the network topology. In this example, these rewards might then be determined by the base reward schedule merely as a fixed fraction of the deemed value of the performed action.

In more sophisticated cases, reward vector R may be augmented by a base reward schedule that specifies a same, fixed reward value for every performing node, but may incorporate a decreasing set of rewards for intermediaries as a function of their distance from the soliciting node. For example, a first node that forwards a solicitation received directly from a seed node may earn 1% of the value of a performance reward associated with that solicitation. A second node that receives the solicitation forwarded from the first node may earn 2% of the value of the performance reward, and a third node that in turn receives the solicitation forwarded from the second node may earn 3% of the value of the performance reward.

As known in the art, many other types of base reward schedules are possible, as desired by an implementer or as deemed appropriate to satisfy one or more technical or business requirements or policies. Embodiments of the present invention are flexible enough to accommodate any such schedule that allows the derivation of a reward vector R, or similar data structure that identifies a base, unweighted reward for every non-seed vertex of the social graph or non-seed node of the underlying network.

In step 340, the element of reward vector or data structure R that corresponds to node or vertex S is weighted by the position value of S derived in step 330. In one example, in which rewards are enumerated in the above reward vector R, the reward associated with vertex or node S may be adjusted by simply multiplying the base reward R(S) for vertex or node S by the value of PV(S), yielding the adjusted version of exemplary reward vector R:

$$R=(R(1), R(2), \ldots R(S)*PV(S), \ldots R(5000))$$

If desired by an implementer, any other type of weighting mechanism or computation may be used to weight each reward R(S) of reward vector R. For example, after position values have been computed for all vertices or nodes S, those values may be normalized or scaled in order to produce weighted reward values that more closely fall into a desired range. In other examples, each reward value R(S) may be weighted by other arithmetic, statistical, or mathematical performed as a function of one or more position values PV(S). A node or vertex S may, for example, be weighted as a function of a position value of S PV(S) and of position values PV(S−1) and PV(S+1) of vertices or nodes adjacent to vertex or node S. Embodiments of the present invention may accommodate any such type of weighting computation desired by a user.

This weighting is repeated for each non-seed vertex or node S, with one vertex or node being weighted during each iteration of the iterative procedure of steps 320-340. At the conclusion of the last iteration, every reward value R(S) will have been adjusted by a corresponding position value PV(S).

Figure 3B:
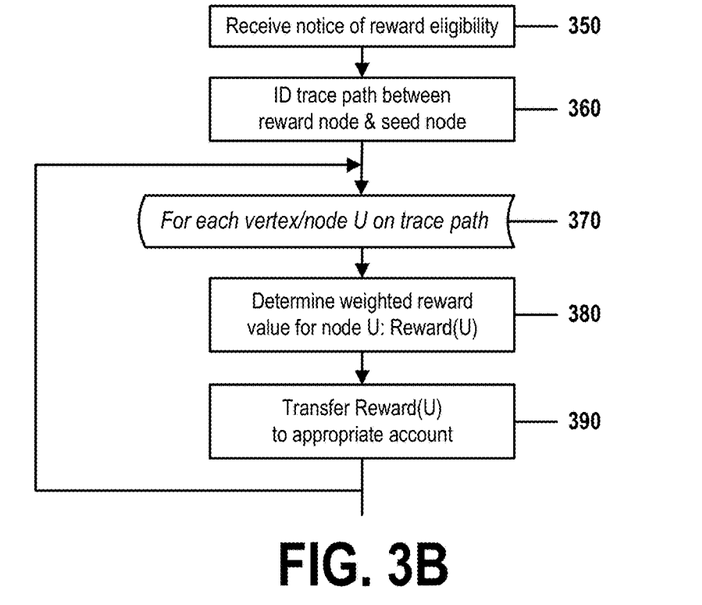
FIG. 3B is a flow chart that illustrates steps of a method for rewarding online users in response to receiving notification that a solicited action has been performed, as a function of network topology in accordance with embodiments of the present invention.

FIG. 3B is a flow chart that illustrates steps of a method for rewarding online users in response to receiving notification that a solicited action has been performed, as a function of network topology in accordance with embodiments of the present invention. FIG. 3B comprises steps 350-390.

In step 350, the processor of the online reward system of FIG. 3A receives notification that a node of the social network has responded to a solicitation by performing the desired action solicited by a seed node of the network.

In step 360, the processor identifies a trace path between the soliciting seed node and the performing node, including an identification of each intermediary node along the path, where each intermediary node forwarded the solicitation along the path between the soliciting and performing nodes.

Step 370 begins an iterative procedure of steps 370-390, which is performed once for each intermediary or performing node U along the trace path.

In step 380, the processor looks up a reward value R(U) for node U by identifying a weighted value of the reward R(U) listed in the reward vector or data structure R. As described above, this weighted reward value was computed in step 340 of FIG. 3A.

In step 390, the processor delivers or communicates to the user at node U the weighted reward. This delivering or communicating may be performed by any means known in the art, such as by transferring a monetary amount to a user account, incrementing a user's balance of non-monetary assets, sending a coupon code to the user, authorizing the user to obtain a discount, allowing the user access to a secured resource, or transferring some other privilege to the user. Embodiments and examples of the present invention described in his document perform this task by means of an integrated account-tracking system that allows the processor to electronically transfer assets to a user's account. Some embodiments may include both a user-accounting system and a means to electronically transfer assets to a user account. But other embodiments may forward reward information to a third-party reward-delivery system or to a third-party asset account, such as an e-payment system.

The iterative procedure continues to reward each user along the trace path in this manner, until all users have received or been notified of their rewards. The method of FIG. 3B may then restart when the processor receives another notification that one or more users has performed a solicited action that qualifies them to receive a reward.

Figure 4:
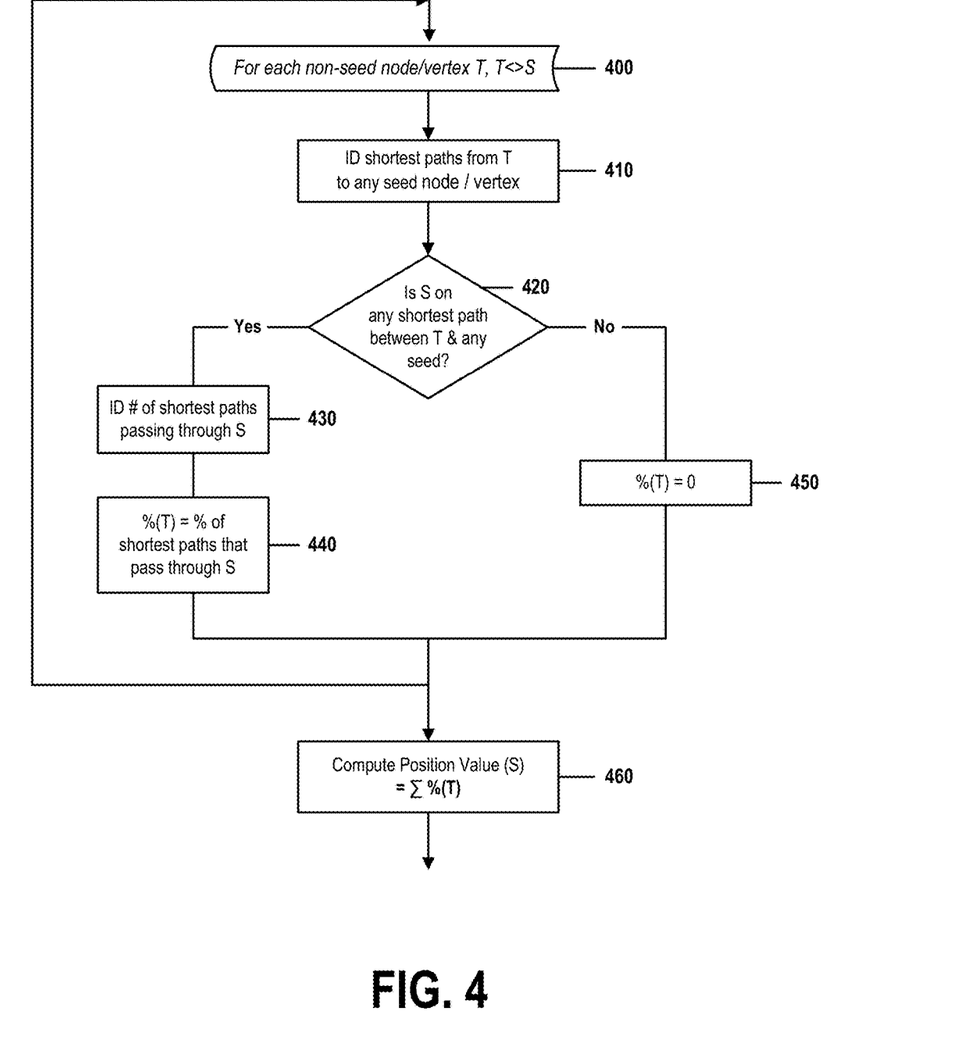
FIG. 4 is a flow chart that illustrates steps for determining a position value of a particular network node in accordance with embodiments of the present invention.

FIG. 4 is a flow chart that illustrates details of FIG. 3A, step 330, for determining a position value of a network node in accordance with embodiments of the present invention. FIG. 4 comprises steps 400-460.

In step 400, the processor of the online reward system begins a procedure to determine a position value PV(S) for node S of the social network identified in step 300. This procedure is equivalent to determining a position value PV(S) for vertex S of the social graph identified in step 300, where the social graph represents the topology of the social network, where vertex S of the social graph represents node S of the social network, and where edges of the social graph adjacent to vertex S respectively represent network connections between node S and other nodes of the social graph.

Step 400 begins an iterative procedure of steps 400-440, which is performed once for every vertex T of the social graph, where T is distinct from node S and where T is not a seed vertex.

In step 410, the processor enumerates the number of shortest paths between vertex T and any seed vertex. This computation involves recognizing that there may be many paths between any two vertices of the graph, but that the most efficient path may often be the one that traverses the lowest number of intermediary vertices. The shortest path may thus represent a most efficient way for an originating network node to deliver a message to a particular recipient node. Within the context of the present invention, when than one path is the same shortest-path length, any of those paths could be considered to be a shortest path.

In one example, consider a shortest-path computation along the social graph 200a of FIG. 2 B, between seed vertex A 215 and a performing node "8" 208.

Three paths are capable of connecting these two vertices:
1) vertex A 215→vertex 7 207→vertex 8 208
2) vertex A 215→vertex 7 207→vertex 11 211→vertex 8 208
3) vertex A 215→vertex 7 207→vertex 11 211→vertex 8 209→vertex 8 208

Path 1 consists of three vertices and thus has a length of 3. Similarly, path 2 has a length of 4 and path 3 has a length of 5, making path 1 the shortest path between vertex 8 and vertex A.

In like manner, the shortest path between vertex "B" 220 and vertex 8 208 is through vertices 5 205, A 215, 7 207 and 8 208. Embodiments of the present invention may, however, omit consideration of such a path because it passes through seed vertex A 215. In cases where A 215 and B 220 present identical solicitations, such embodiments may consider only the shortest path to any performing vertex. In this example, the shortest path from A 215 to vertex 8 208 has length 3, but the shortest path from B 220 to vertex 8 208 has length 5, making path 1) the shortest path between vertex 8 208 and any seed vertex. As a corollary to this explanation, any shortest path that includes an intermediary vertex that is a seed vertex could not be a shortest path.

In one last example a shortest-path computation may produce more than one shortest path. For example, there are two equal-length shortest paths between a seed vertex A 215 and a performing node "9" 209:
1) vertex A 215→vertex 7 207→vertex 8 208→vertex 9 209
and
2) vertex A 215→vertex 7 207→vertex 11 211→vertex 9 209

In such cases, the total number of shortest paths will be accounted for in the computations of step 430.

At the conclusion of step 410, the processor will have identified a shortest path between a seed node and every non-seed vertex that is distinct from vertex S.

In step 420, the processor determines whether vertex S (representing the node for which a position value is being computed) represents an intermediary node on any of the shortest paths between vertex or node T and any seed vertex or node, as enumerated in step 410. If the processor determines that vertex S does represent such an intermediary node, then the method of FIG. 4 performs steps 430 and 440. But if it determines that vertex S does not represent such an intermediary node, then the method of FIG. 4 instead performs step 450.

In step 430, the processor counts the number of shortest paths between vertex or node T and any seed vertex or node in which the shortest path includes intermediary vertex or node S.

In step 440 the processor determines the percent % (T) of the total number of shortest paths (identified in step 410) that include intermediary vertex or node S (identified in step 430).

In step 450, the processor sets % (T)=0 because the processor determined in step 420 that no shortest paths between vertex or node T and any seed vertex or node comprise intermediary vertex or node S.

In step 460, the processor computes a position value PV(S) of node S by summing the percent values % (T) of the shortest paths between any seed node and any non-seed non-S node that do not comprise node S. If the resulting percent value is then normalized to assign a position value of 1.00 to a sum of 100%, this step may be performed by means of the equation:

$$PV(S) = \sum_{i=1}^{T} \% \ (i) / 100\%$$

In one example of this procedure, consider a method of deriving PV(7), the position value of node or vertex "7" 207 of the social graph 200a of FIG. 2A. Social graph 200a contains two seed vertices, vertex "A" 215 and vertex "B" 220.

In step 410, the processor determines the shortest paths between every non-seed vertex (other than vertex 7 207) and either seed node A 215 or seed vertex B 220.

In step 420, the processor identifies whether vertex 7 207 is an intermediary node of any of the shortest paths identified in step 410.

This yields:

| Seed Vertex | Performing Vertex | Shortest Paths | # of Shortest Paths | 7 On Path? |
|---|---|---|---|---|
| A | 1 | A - 6 - 2 - 1<br>A - 6 - 3 - 1 | 2 | N |
| A | 2 | A - 6 - 2 | 1 | N |
| A | 3 | A - 6 - 3 | 1 | N |
| A | 4 | A - 6 - 3 - 4<br>A - 5 - B - 4 | 2 | N |
| A | 5 | A - 5 | 1 | N |
| A | 6 | A - 6 | 1 | N |
| A | 8 | A - 7 - 8 | 1 | Y |
| A | 9 | A - 7 - 8 - 9<br>A - 7 - 11 - 9 | 2 | Y |
| A | 10 | A - 7 - 11- 10 | 1 | Y |
| A | 11 | A - 7 - 11 | 1 | Y |
| B | 1 | B - 2 - 1<br>B - 3- 1 | 2 | N |
| B | 2 | B - 2 | 1 | N |
| B | 3 | B - 3 | 1 | N |
| B | 4 | B - 4 | 1 | N |
| B | 5 | B - 5 | 1 | N |
| B | 6 | B - 2 - 6<br>B - 3 - 6 | 2 | N |
| B | 8 | B - 5 - A - 7 - 8 | 1 | Y |
| B | 9 | B - 5 - A - 7 - 8 - 9<br>B - 5 - A - 7 - 11 - 9 | 2 | Y |
| B | 10 | B - 5 - A - 7 - 11- 10 | 1 | Y |
| B | 11 | B - 5 - A - 7 - 11 | 1 | Y |

This table may optionally be compressed by eliminating any shortest paths in which a seed vertex is an intermediary vertex. By default, such a path cannot be the shortest path from the performing vertex to any seed vertex. In this example, such a compressed table would be:

| Seed Vertex | Performing Vertex | Shortest Path | # of Shortest Paths |
|---|---|---|---|
| A | 1 | A - 6 - 2 - 1<br>A - 6 - 3 - 1 | 2 |
| A | 2 | A - 6 - 2 | 1 |
| A | 3 | A - 6 - 3 | 1 |
| A | 5 | A - 5 | 1 |
| A | 6 | A - 6 | 1 |
| A | 8 | A - 7 - 8 | 1 |
| A | 9 | A - 7 - 8 - 9<br>A - 7 - 11 - 9 | 2 |
| A | 10 | A - 7 - 11- 10 | 1 |
| A | 11 | A - 7 - 11 | 1 |
| B | 1 | B - 2 - 1 | 1 |
| B | 2 | B - 2 | 1 |
| B | 3 | B - 3 | 1 |
| B | 4 | B - 4 | 1 |
| B | 5 | B - 5 | 1 |
| B | 6 | B - 2 - 6<br>B - 3 - 6 | 2 |

In steps 430 and 440, the processor determines, for each vertex T, the % (T) percent or proportion of shortest paths from S to any seed vertex that comprise intermediary node 7. This determination is performed by dividing a value of the "# of Paths With Node 7" column in the below table by a value of the "# of Shortest Paths" column. This yields:

| Seed Vertex | Performing Vertex | Shortest Path | # of Shortest Paths | # of Paths With 7? | % (T) |
|---|---|---|---|---|---|
| A | 1 | A - 6 - 2 - 1<br>A - 6 - 3 - 1 | 2 | 0 | 0 |
| A | 2 | A - 6 - 2 | 1 | 0 | 0 |
| A | 3 | A - 6 - 3 | 1 | 0 | 0 |
| A | 5 | A - 5 | 1 | 0 | 0 |
| A | 6 | A - 6 | 1 | 0 | 0 |
| A | 8 | A - 7 - 8 | 1 | 1 | 100 |
| A | 9 | A - 7 - 8 - 9<br>A - 7 - 11 - 9 | 2 | 2 | 100 |
| A | 10 | A - 7 - 11- 10 | 1 | 1 | 100 |
| A | 11 | A - 7 - 11 | 1 | 1 | 100 |
| B | 1 | B - 2 - 1 | 1 | 0 | 0 |
| B | 2 | B - 2 | 1 | 0 | 0 |
| B | 3 | B - 3 | 1 | 0 | 0 |
| B | 4 | B - 4 | 1 | 0 | 0 |
| B | 5 | B - 5 | 1 | 0 | 0 |
| B | 6 | B - 2 - 6<br>B - 3 - 6 | 2 | 0 | 0 |

Here, 100% of four sets of shortest paths (those paths between node A 215 or B 220 and vertex 8 208, 9 209, 10 210, or 11 211) comprise vertex 7. No other shortest path (those between node A 215 or B 220 and vertex 8 208, 9 209, 10 210, or 11 211) comprises vertex 7 as an intermediary vertex, and is thus associated with a % (T) value equal to 0. This results in a position value for node for vertex 7 equal to:

$$PV(7) = \sum_{i=1}^{T} \%\ (i)/100\% = \frac{100\% + 100\% + 100\% + 100\%}{100\%} = 4.00$$

In some embodiments of the present invention, position values may be also used for other purposes, such as ranking nodes of a network in terms of positional importance. Such ranking may be used to facilitate efficient operation of an online-reward system in other ways, such as by identifying nodes of a network topology that are best positioned to function as seed nodes because of their higher position values, by ranking nodes in order of position value in order to identify bottlenecks or gatekeeper nodes that may interfere with an efficient distribution of a solicitation, or by flagging adverse effects on solicitation or award-distribution paths caused by a topology change.

Figure 5:
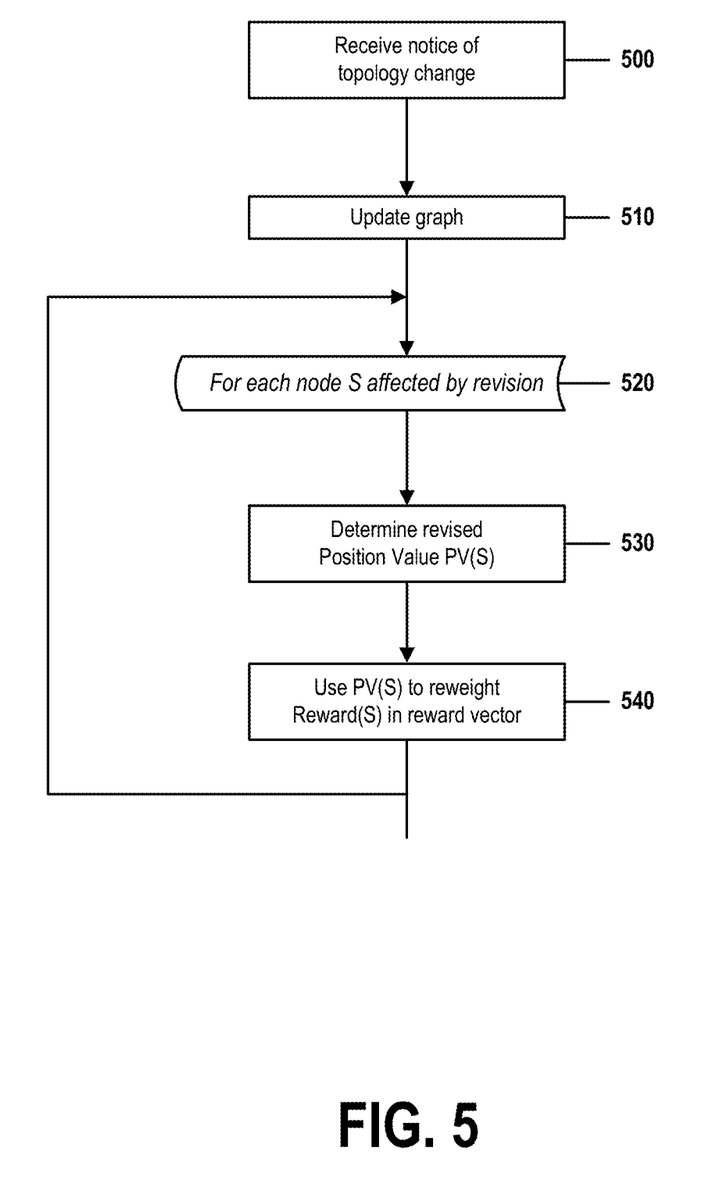
FIG. 5 is a flow chart that illustrates steps for efficiently updating partial incentive values in response to a change in network topology, in accordance with embodiments of the present invention.

FIG. 5 is a flow chart that illustrates steps for efficiently updating partial incentive values in response to a change in network topology, in accordance with embodiments of the present invention.

In step 500, the online reward system of FIGS. 2A-4 receives notification of a change to a relevant element of the network topology identified in FIG. 3A. This change may comprise an addition or deletion of a node or an alteration in the connections between nodes. Such changes may include, but are not limited to, an opening or a closing of a user account, a user signing onto or signing off from the social network, an establishment of a new connection between two nodes or a deletion of an existing connection between two nodes, or an addition of a new seed node or a deletion of an existing seed node. Such changes may occur, for example, when a user adds a banking account to her social-network user profile, allowing her to receive incentive rewards, or when a social-network user establishes a "friend," "follower," or "like" relationship with another user of the network.

In step 510, the processor of the online reward system updates the social graph received in step 300 to incorporate the changes identified in step 500. This may comprise tasks like adding a vertex or an edge to the graph or removing a vertex or an edge from the graph.

Step 520 begins an iterative procedure of steps 520 to 540, which is performed once for every vertex S of the social graph received in step 300 that is affected by the network-topology change identified in step 500.

In step 530, the processor adds or revises a position value of vertex S, PV(S) by means of a procedure similar to that of step 330, as described in FIG. 4. This step may not be performed if the change reported in step 500 comprises deleting, rather than revising or updating, a node.

In step 540, the processor revises the reward associated with node S (or, equivalently, with vertex S) by means similar to those described in step 340. If the change reported in step 500 deletes node S, then this task comprises deleting from reward vector R the previously reweighted reward value for node S. If the change reported in step 500 revises an existing node S, then this task comprises reweighting the previously reweighted reward value for node S in reward vector R by any method similar to those described in step 340.

If the change reported in step 500 adds a new node S, then this task comprises identifying base reward value R(S) for the new node S and then weighting R(S) as a function of position value PV(S) by any method similar to those described in 340. In some embodiments, this task may comprise requesting, retrieving, or otherwise determining an original base reward value R(S). This base reward value may, for example, be received along with the change notification of step 500; it may be identified from known sources, such as a network-topology database, configuration file, network-management facility, or other resource; or it may be determined by the processor from information or rules received in step 300.

Each iteration of the iterative procedure of steps 520-540 in a similar way determines a weighted R(S) value one vertex or node S identified in step 500 as having been part of a network topology change. At the conclusion of the last iteration, every reward value R(S) will have been adjusted by a corresponding position value PV(S) and an embodiment of the present invention may continue with a method of FIG. 3B.

What is claimed is:

1. An online reward system comprising a processor, a memory coupled to the processor, a network interface capable of allowing the processor to transfer an online reward to an account of a user of a network, and a computer-readable hardware storage device coupled to the processor, the hardware storage device containing program code configured to be run by the processor via the memory to implement a method for rewarding online users as a function of network topology, the method comprising:

the processor receiving a representation of a topology of the network and a set of base reward values, where each value of the set of base reward values identifies a value of a reward to be awarded to a user who, at a particular node of the network, either performs a solicited action or forwards to another node of the network a previously received solicitation to perform the solicited action;

the processor identifying a set of seed nodes of the network that are each capable of soliciting the solicited action;

the processor computing a position value for each non-seed node of the network as a function of the position of the each non-seed node in the topology, where the computing a position value for a non-seed node S of the network comprises:

the processor deriving, for a first node T of the network, a set of shortest paths from any seed node of the network to T, where T is not a seed node and is distinct from node S;

the processor determining a per cent % (T) of the set of shortest paths that comprises node S;

the processor repeating the deriving and the determining for every remaining node of the network that is not a seed node and is distinct from nodes S and T; and the processor calculating a position value PV(S) of node S as a sum of the determined per cent % (i) values of all nodes i of the network that are not seed nodes and are distinct from node S;

the processor adjusting the set of base reward values as a function of the computed position values;

the processor detecting that a user at a performing node of the network has performed an activity solicited by a soliciting node of the set of seed nodes;

the processor associating with an eligible node a value of a final reward, as a function of an adjusted value of the adjusted set of base reward values that is associated with the eligible node, where the eligible node lies on a network path connecting the soliciting node to the performing node; and the processor delivering the final reward to an account associated with a user of the eligible node.

2. The system of claim 1, further comprising:

the processor receiving a revised version of the topology of the network; and the processor, in response to the receiving, repeating the identifying, the computing, and the adjusting.

3. The system of claim 1, where the representation of a topology is an undirected graph that represents the topology as a set of vertices and a set of edges, where each vertex of the graph represents a node of the network, and where each edge of the graph that connects two vertices of the graph represents a network connection between the two nodes of the network represented by the two vertices.

4. The system of claim 1, where the adjusting a first reward value of the set of base reward values that is associated with a first node of the network comprises weighting the first reward value as a function of a computed position value of the first node.

5. The system of claim 1, where an adjusted base reward provides a monetary benefit to the user of the eligible node.

6. The system of claim 1, where an adjusted base reward qualifies the user of the eligible node to access a secured online asset.

7. A method for rewarding online users as a function of network topology, the method comprising:

a processor of a computer system receiving a representation of a topology of the network and a set of base reward values, where each value of the set of base reward values identifies a value of a reward to be awarded to a user who, at a particular node of the network, either performs a solicited action or forwards to another node of the network a previously received solicitation to perform the solicited action;

the processor identifying a set of seed nodes of the network that are each capable of soliciting the solicited action;

the processor computing a position value for each non-seed node of the network as a function of the position of the each non-seed node in the topology, where the computing a position value for a non-seed node S of the network comprises:

the processor deriving, for a first node T of the network, a set of shortest paths from any seed node of the network to T, where T is not a seed node and is distinct from node S;

the processor determining a per cent % (T) of the set of shortest paths that comprises node S;

the processor repeating the deriving and the determining for every remaining node of the network that is not a seed node and is distinct from nodes S and T; and the processor calculating a position value PV(S) of node S as a sum of the determined per cent % (i) values of all nodes i of the network that are not seed nodes and are distinct from node S;

the processor adjusting the set of base reward values as a function of the computed position values;

the processor detecting that a user at a performing node of the network has performed an activity solicited by a soliciting node of the set of seed nodes;

the processor associating with an eligible node a value of a final reward, as a function of an adjusted value of the adjusted set of base reward values that is associated with the eligible node, where the eligible node lies on a network path connecting the soliciting node to the performing node; and the processor delivering the final reward to an account associated with a user of the eligible node.

8. The method of claim 7, further comprising:

the processor receiving a revised version of the topology of the network; and the processor, in response to the receiving, repeating the identifying, the computing, and the adjusting.

9. The method of claim 7, where the representation of a topology is an undirected graph that represents the topology as a set of vertices and a set of edges, where each vertex of the graph represents a node of the network, and where each edge of the graph that connects two vertices of the graph represents a network connection between the two nodes of the network represented by the two vertices.

10. The method of claim 7, where the adjusting a first reward value of the set of base reward values that is associated with a first node of the network comprises weighting the first reward value as a function of a computed position value of the first node.

11. The method of claim 7, where an adjusted base reward provides a monetary benefit to the user of the eligible node.

12. The method of claim 7, further comprising providing at least one support service for at least one of creating, integrating, hosting, maintaining, and deploying computer-readable program code in the computer system, wherein the computer-readable program code in combination with the computer system is configured to implement the receiving, the identifying, the computing, the adjusting, the detecting, the associating, and the delivering.

13. A computer program product, comprising a computer-readable hardware storage device having a computer-readable program code stored therein, the program code configured to be executed by an online reward system comprising a processor, a memory coupled to the processor, a network interface capable of allowing the processor to transfer an online reward to an account of a user of a network, and a computer-readable hardware storage device coupled to the processor, the hardware storage device containing program code configured to be run by the processor via the memory to implement a method for rewarding online users as a function of network topology, the method comprising:
  the processor receiving a representation of a topology of the network and a set of base reward values, where each value of the set of base reward values identifies a value of a reward to be awarded to a user who, at a particular node of the network, either performs a solicited action or forwards to another node of the network a previously received solicitation to perform the solicited action;
  the processor identifying a set of seed nodes of the network that are each capable of soliciting the solicited action;
  the processor computing a position value for each non-seed node of the network as a function of the position of the each non-seed node in the topology, where the computing a position value for a non-seed node S of the network comprises:
    the processor deriving, for a first node T of the network, a set of shortest paths from any seed node of the network to T, where T is not a seed node and is distinct from node S;
    the processor determining a per cent % (T) of the set of shortest paths that comprises node S;
    the processor repeating the deriving and the determining for every remaining node of the network that is not a seed node and is distinct from nodes S and T; and
    the processor calculating a position value PV(S) of node S as a sum of the determined per cent % (i) values of all nodes i of the network that are not seed nodes and are distinct from node S;
  the processor adjusting the set of base reward values as a function of the computed position values;
  the processor detecting that a user at a performing node of the network has performed an activity solicited by a soliciting node of the set of seed nodes;
  the processor associating with an eligible node a value of a final reward, as a function of an adjusted value of the adjusted set of base reward values that is associated with the eligible node, where the eligible node lies on a network path connecting the soliciting node to the performing node; and
  the processor delivering the final reward to an account associated with a user of the eligible node.

14. The computer program product of claim 13, further comprising:
  the processor receiving a revised version of the topology of the network; and
  the processor, in response to the receiving, repeating the identifying, the computing, and the adjusting.

15. The computer program product of claim 13, where the representation of a topology is an undirected graph that represents the topology as a set of vertices and a set of edges, where each vertex of the graph represents a node of the network, and where each edge of the graph that connects two vertices of the graph represents a network connection between the two nodes of the network represented by the two vertices.

16. The computer program product of claim 13, where the adjusting a first reward value of the set of base reward values that is associated with a first node of the network comprises weighting the first reward value as a function of a computed position value of the first node.

17. The computer program product of claim 13, where an adjusted base reward provides a monetary benefit to the user of the eligible node.

\* \* \* \* \*